June 20, 1939.　　　　A. H. WAAGE　　　　2,163,297

THERMOSTAT REMOTE CONTROL

Filed Aug. 10, 1937

INVENTOR.
*Alvin H. Waage*
BY *James Harrison Bowen*
ATTORNEY.

Patented June 20, 1939

2,163,297

UNITED STATES PATENT OFFICE 2,163,297

THERMOSTAT REMOTE CONTROL

Alvin H. Waage, Westfield, N. J.

Application August 10, 1937, Serial No. 158,291

4 Claims. (Cl. 219—20)

The purpose of this invention is to provide means for breaking or controlling the circuit to a heated body or other device, in which the device may be located at a remote point from the body, and thereby not affected by the temperature of said heated body.

The invention is the use of a short section or strand of high positive temperature coefficient metal connected in series with or to the element of a heated body or device, and this strand of metal is connected through a variable resistance coil surrounding a section of the bimetal of a thermostat, or to a relay, or the like, so that as the temperature of the heated body or device heats the strand of metal, having a high temperature coefficient, it will build up sufficient potential difference to regulate or control current, indicate temperature or break a circuit.

In heating objects with electric heating elements in which it is desired to incorporate a thermostat to break the circuit at a predetermined temperature, the thermostat is incorporated in the object so that it is affected by the high temperature thereof, and the life thereof is relatively short, whereas, if the thermostat can be located at a remote point where it is subjected only to atmospheric temperature, the life and operation thereof will be increased and improved.

One object of this invention is, therefore, to provide means to operate a thermostat to break or control a circuit by the temperature of a heated body with the thermostat situated at a remote point.

Another object is to provide a method of incorporating a metal having a relatively high temperature coefficient in a heated body, so that it may build up sufficient force at a remote point to operate a thermostat or circuit controlling or indicating device.

A further object is to provide a relatively small section of high temperature coefficient metal in a heated body, for operating a control device of a circuit to said body, in which the temperature of said body may be controlled through said device.

And a still further object is to provide a device for operating a circuit controlling device of an electrically heated body situated at a remote point from said body, which is of a simple and economical construction.

With these ends in view the invention embodies a section of high temperature coefficient metal in combination with a heating element or device, and connected in series to operate to control, indicate, or break a circuit, and means adjusting the operating temperature of said device.

Other features and advantages of the invention will appear from the following description taken in connection with the drawing, wherein.

Figure 4:
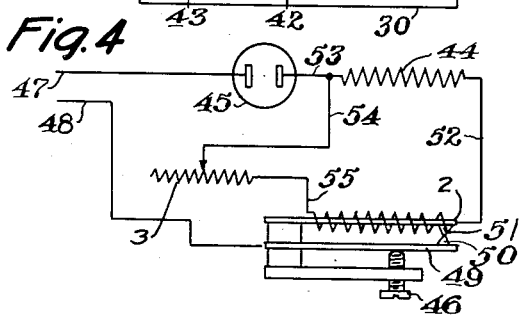

Figure 4 also shows a similar device in which the thermostat is provided with adjusting means.

In the drawing the device is shown as it may be made, wherein numeral 1 indicates an electric heating element, numeral 2, a bimetal strip of a thermostat, numeral 3, a coil of an adjustable resistance, and numeral 4, a strand of metal having a high temperature coefficient and being positive in all designs.

One terminal 5 of the element 1 may be connected through a wire 6 to a source of current supply, and the other terminal 7 may be connected to the source of supply through a wire 8 passing through the thermostat 2, and a wire 9 as shown.

The strand 4 which has a high temperature coefficient is connected to the element between the points 7 and 10, and through a terminal 11, and a wire 12 to a coil 13, around the bimetal element 2, with the end of the coil 13 attached to a contact point 14, and this contact point engages another contact point 15 on a lower section 16 of the thermostat, completing the circuit from the strand 4 through the member 2 and the wire 9. In this design the position of the contact members of the thermostat may be adjusted by a screw 17, in a base member 18, attached to the thermostat through insulating blocks 19 and 20. It will be understood, however, that these members may be adjusted in any manner or by any means.

With these parts connected in this manner, and with a suitable voltage applied through the wires 6 and 9, the combined resistance of the parts 1 and 4 will cause the iron or device to become heated, and, as the change in temperature occurs, the resistance of the heating coil 1 remains substantially constant whereas the resistance of the part 4 is variable, increasing rapidly as the temperature increases, and, as this resistance increases, the potential difference between the points 7 and 10 increases, causing an increase of energy in the thermostat winding 13. This produces heat in the member 2, and this heat, which is low as compared to the body of the iron, causes the bimetal to change shape and break the contact between the points 14 and 15. With this break in the circuit the heat is instantly cut off in the coil 13, which permits the bimetal to cool quickly and the contact between the points 14 and 15 is resumed, thereby causing heat to accumulate in the iron or device again. This, in turn, builds up heat in the coil 13, thus continuing the cycle at substantially constant temperature or at a desired temperature.

This device may be located in the handle of an electric iron and provided with an adjusting screw 17 or an eccentric cam so that the position of the member 16 may readily be adjusted to obtain substantially any temperature desired.

Figure 1:
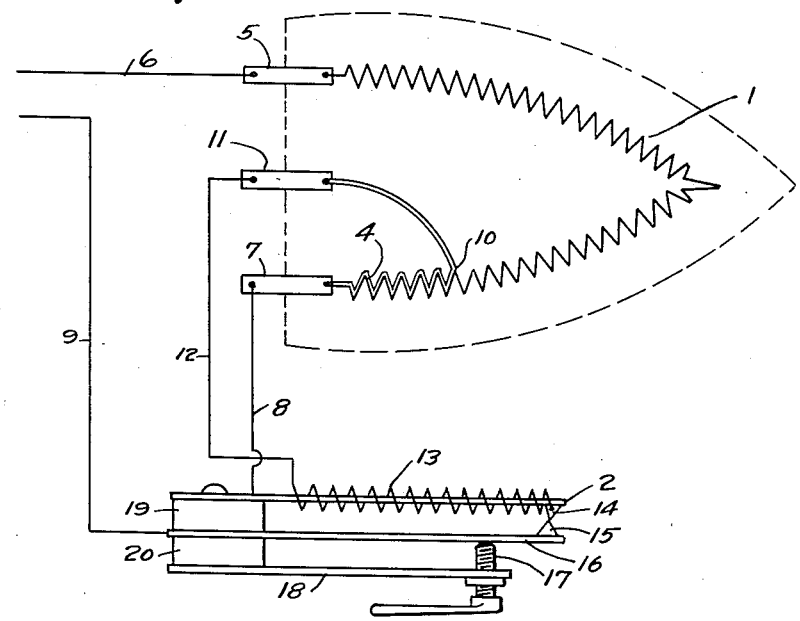
Figure 1 is a diagrammatic view showing the operating circuit as it may be used in an electric iron, with the iron indicated by dotted lines.
Figure 2:
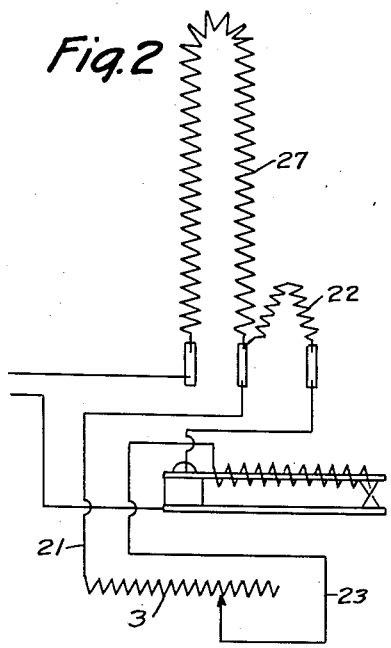
Figure 2 is a view showing a similar circuit of an alternate design in which the high temperature coefficient metal is provided as a separate unit, and the controlling circuit is provided with an adjustable resistance.

The design shown in Figure 2 is similar to that shown in Figure 1, except that a wire 21, similar to the wire 12, from the member 22, similar to the member 4 and which is shown as a separate coil, passes through an adjustable resistance 3, from which it is connected to the thermostat coil through a wire 23.

Figure 3:
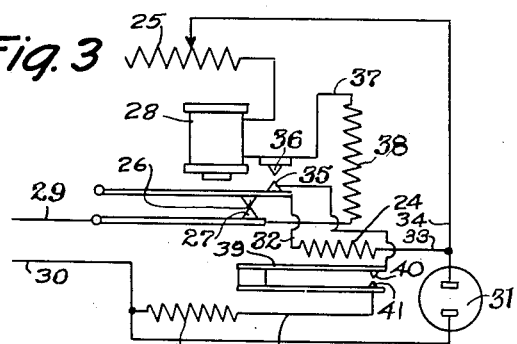
Figure 3 shows an alternate arrangement in which the device forms a separate unit that may be used independently and attached or connected to any device, and in this design a relay is used as the controlling element.

In the design shown in Figures 3 and 4, the device is shown as a separate and independent unit which may be incorporated in a cord of an electric appliance and used independently, or connected or attached to an appliance or device in any manner, or used in combination with any object or device; in which it may be desired to regulate, indicate, or shut off the current.

In the design shown in Figure 3, the metal or alloy having the high temperature coefficient is indicated by the numeral 24, and this is connected in a circuit with an adjustable resistance 25 and a relay formed with contact points 26 and 27 and an electromagnet 28, and the current may be supplied through wires 29 and 30, with a plug or receptacle 31 which may be placed over the terminals of an electric iron or other appliance. It will be noted that, as the current is applied, it will normally pass from the wire 30 directly to the receptacle, and from the wire 29 through the points 26 and 27, and the wire 32 to the high temperature coefficient element 24, and from there to the other terminal of the receptacle through wires 33 and 34, and, when the electrical resistance in the element 24 reaches a predetermined amount, it will send sufficient E. M. F. through the wire 34 and the variable resistor 25 to energize the magnet 28, and this will raise the contact point 26 and break the circuit. When this movement takes place, a contact point 35 on the member 26 will engage a contact point 36, and this will send enough current through the wire 37 and the resistance 38 to form a completed circuit to the receptacle 31, although the resistance 38 will check the amount of current, permitting the iron or other appliance to cool until an arm 39 of a thermostatic switch, which has been held upward by the heat of the element 24, to drop downward so that a contact point 40 will engage a point 41 and complete a circuit through the wire 42 and resistance 43 to the wire 30, thereby by-passing the magnet 28 which will permit the point 26 to drop and contact the point 27 so that the original circuit will be completed. It is appreciated that the changes in the temperature of the element 24 will not be exactly the same as the changes in the temperature of the appliance, however, the difference is very slight, and the resistor 25 may be set to compensate for the difference, and, in fact, by adjusting the resistor 25, it is possible to hold the temperature of an iron or other appliance at a substantially constant point.

In the design shown in Figure 4 the high temperature coefficient metal 44 is connected in series with the thermostat 2, and the adjustable resistance 3 is positioned between the thermostat and the receptacle 45. In this design the thermostat may be adjusted by a screw 46 as shown, and by using both the means for adjusting the thermostat and the adjustable resistance a wide range in regulation can be obtained, and this will be sufficient to compensate for the differences between the variations in the temperatures of an iron or other appliance and those of the element 44. In this design, the wires 47 and 48 are connected to a source of electric current, and the receptacle or plug 45 may be plugged into an electric iron or other appliance, or this receptacle may receive a plug at the end of an iron cord or the like. The wire 47 is connected directly to a terminal of the receptacle, and the wire 48 is connected to a member 49 of the switch in which the points 50 and 51 are normally in contact, and are only separated when the resistance in the element 44 builds up sufficiently to raise the temperature in a thermostat 2, so that it will open the contact points 50 and 51. The point 51 is connected by a wire 52 to the element 44, and the opposite end of the element is connected by a wire 53 to the receptacle. The wire 53 is also connected by a wire 54 to the variable resistance 3, and this is connected by a wire 55 to the coil of the thermostat.

It will be understood that other changes may be made in the process without departing from the spirit of the invention. One of said changes may be in the use of a circuit breaker, controller, or indicator or any other type, in place of the thermostat, another may be in the use of any other means for adjusting the temperature at which the device operates, and still another may be in the use of any other means for connecting the various parts.

The construction will be readily understood from the foregoing description. In use the device may be installed as shown and described, and it will be understood that it may be used in, or in connection with, any heated body, and the parts may be located at any suitable point or points. When used in an electric iron, the heating element is located in the body of the iron, and the thermostat may be placed in the handle, or at any suitable point, thereby removing it from the heat of the iron.

The theory of this device is that of using a comparatively high temperature coefficient metal or alloy in series with a heating element of low temperature coefficient. This high temperature coefficient metal may be part of the element or a separate unit which can be connected in series with the element and held in contact with the body to be heated so that it will respond to the temperature of same.

The resistance of the high temperature coefficient metal will increase with heat and thereby build up E. M. F. to heat the coil of resistance wire around the thermostat and cause it to operate with changes of temperature of the body heated.

The thermostat can be controlled by adjusting the tension thereof, or by having a resistance in series with the thermostat coil, so that the heat can be controlled by adjusting the resistance.

This method of control makes it possible to locate the thermostat where most convenient and so that it can be operated in very low temperatures which means that its life will be much greater than if it were working under the high temperature of the heated body.

The current to operate the thermostat is obtained by the voltage across the high temperature coefficient metal or alloy, and this voltage varies from one to several hundred percent, thereby providing a means of very sensitive adjustment. The high temperature coefficient metal may be of the same size as that of the heating element, or may be smaller or larger as may be desired in order to obtain the desired result.

The voltages across the high temperature metal may also be used to indicate temperature, as it may be connected to a volt meter calibrated in degrees, so that the device would be adapted for use for ovens, furnaces, or other devices where correct temperature is imperative.

Having thus fully described the invention, what I claim as new and desire to secure by Letters Patent, is:

1. A temperature control device, particularly adapted for electrically heated appliances, comprising a circuit breaker remotely situated from the body of the appliance, and means controlling the operating circuit of said circuit breaker comprising a piece of material having a high temperature coefficient of resistance in series with a heating element in said appliance, said high temperature coefficient unit adapted to increase the electromotive force of the said circuit breaker as the temperature of the body of the appliance increases, and substantially in proportion to the increase of the temperature thereof, and means adjusting said circuit breaker to maintain a substantially even temperature in the body of said appliance; said circuit breaker having a bimetal element influenced by a coil in parallel with the metal having a high temperature coefficient of resistance.

2. A device, as described in claim 1, characterized in that the electric supplying circuit is connected directly to one terminal of the heating element at one point, and to the opposite terminal of the heating element through the said circuit breaker, and the high temperature coefficient material is connected at one end to the terminal of the heating element through which the supply current passing through the circuit breaker is connected and to the operating circuit of the circuit breaker at the other end, thereby being in series with the said heating element.

3. A control unit for devices electrically heated, comprising a thermostat in the circuit of the said device, and a unit of material having a high temperature coefficient of resistance connected in series with the heating element of the said device and positioned to be influenced thereby, and also connected in parallel with the operating circuit of the said control unit, and adapted to intermittently operate said unit to make and break the circuit with a pulsating action dependent upon the temperature of the said device.

4. A control device, as described in claim 3, characterized by adjusting means for the said control unit adapted to set the unit to maintain a substantially even temperature in the said device.

ALVIN H. WAAGE.